(12) United States Patent
Colston et al.

(10) Patent No.: US 10,105,007 B2
(45) Date of Patent: Oct. 23, 2018

(54) GRILLING DEVICE WITH WARMING CABINET

(71) Applicant: Traeger Pellet Grills, LLC, Salt Lake City, UT (US)

(72) Inventors: Michael Colston, Salt Lake City, UT (US); Daniel Altenritter, Riverton, UT (US); Matthew Czach, Kalamazoo, UT (US)

(73) Assignee: Traeger Pellet Grills, LLC, Salt Lake City, UT (US)

( * ) Notice: Subject to any disclaimer, the term of this patent is extended or adjusted under 35 U.S.C. 154(b) by 0 days.

(21) Appl. No.: 14/906,526

(22) PCT Filed: Aug. 21, 2015

(86) PCT No.: PCT/US2015/046349
§ 371 (c)(1),
(2) Date: Jan. 20, 2016

(87) PCT Pub. No.: WO2016/153547
PCT Pub. Date: Sep. 29, 2016

(65) Prior Publication Data
US 2017/0196400 A1    Jul. 13, 2017

Related U.S. Application Data

(60) Provisional application No. 62/138,217, filed on Mar. 25, 2015.

(51) Int. Cl.
*A47J 37/07* (2006.01)
*A23L 5/10* (2016.01)

(52) U.S. Cl.
CPC ............ *A47J 37/0704* (2013.01); *A23L 5/10* (2016.08); *A47J 37/0786* (2013.01); *A23V 2002/00* (2013.01)

(58) Field of Classification Search
CPC .... A47J 37/0704; A47J 37/0786; A47J 37/07; A47J 36/24; A47J 36/2477;
(Continued)

(56) References Cited

U.S. PATENT DOCUMENTS

| 1,300,710 A | 4/1919 | Ewards |
| 2,902,026 A | 9/1959 | Hathorn |

(Continued)

FOREIGN PATENT DOCUMENTS

CN    104352179    2/2015

OTHER PUBLICATIONS

International Search Report for application No. PCT/US2016/051060 dated Dec. 8, 2016.
(Continued)

*Primary Examiner* — Alfred Basichas
(74) *Attorney, Agent, or Firm* — Workman Nydegger

(57) ABSTRACT

A grilling device includes an oven section and a warming cabinet in thermal communication with the oven section. The oven section is directly heated by a heating mechanism, but the warming cabinet is heated indirectly by heat transferred from the oven section. The warming cabinet is disposed below the oven section such that heat from the oven section is transferred passively via conduction and radiation into the warming cabinet and is transferred actively via forced air convection as an air moving element forces air past an optional heat sink and/or other heating component(s) and into the warming cabinet. The air moving element also provides air to ignite and maintain a burning fuel source of the heating mechanism. The grill can include a utility shelf disposed below the warming cabinet, the space between the utility shelf and the bottom of the warming cabinet defining a utility space.

19 Claims, 9 Drawing Sheets

(58) Field of Classification Search
CPC ..... A47J 36/2483; A47J 36/2494; A23L 5/10; A23V 2002/00
See application file for complete search history.

(56) References Cited

U.S. PATENT DOCUMENTS

| | | |
|---|---|---|
| 3,533,393 A | 10/1970 | Haapanen |
| 3,665,913 A | 5/1972 | Cagle |
| 3,769,901 A | 11/1973 | Phillips |
| 3,938,493 A | 2/1976 | Bauer |
| 4,076,008 A | 2/1978 | Deaton |
| 4,362,093 A | 12/1982 | Griscom |
| 4,592,335 A | 6/1986 | Beller |
| 4,665,891 A | 5/1987 | Nemec |
| 4,700,618 A | 10/1987 | Cox |
| 4,788,906 A | 12/1988 | Starks |
| 5,031,602 A | 7/1991 | Vick |
| 5,070,857 A | 12/1991 | Sarten |
| 5,163,359 A | 11/1992 | McLane |
| 5,404,795 A | 4/1995 | Coble |
| 5,473,979 A | 12/1995 | Ruben |
| 5,481,964 A | 1/1996 | Kitten |
| 5,524,610 A | 6/1996 | Clark |
| 5,694,917 A | 12/1997 | Giebel |
| 5,934,180 A | 8/1999 | Lin |
| 5,947,007 A | 9/1999 | O'Grady |
| 6,000,388 A | 12/1999 | Andress |
| 6,125,836 A | 10/2000 | Felton |
| 6,182,560 B1 | 2/2001 | Andress |
| 6,189,528 B1 | 2/2001 | Oliver |
| 6,209,533 B1 | 4/2001 | Ganard |
| 6,422,134 B1 | 7/2002 | Barksdale |
| 6,557,545 B2 | 5/2003 | Williams |
| 6,810,792 B1 | 11/2004 | Knight |
| 6,913,011 B1 | 7/2005 | Snider |
| D510,835 S | 10/2005 | Pai |
| D534,755 S | 1/2007 | Knight |
| D535,522 S | 1/2007 | Seager |
| 7,156,087 B1 | 1/2007 | Churchill, III |
| 7,624,675 B2 | 12/2009 | Galdamez |
| 7,753,047 B1 | 7/2010 | Trammell |
| 7,984,709 B1 | 7/2011 | Brynes |
| D660,646 S | 5/2012 | Simms |
| 8,381,712 B1 | 2/2013 | Simms |
| D680,794 S | 4/2013 | Chung |
| 8,915,238 B2 | 12/2014 | Goeken |
| D739,170 S | 9/2015 | Chung |
| D786,014 S | 5/2017 | Knight |
| 2003/0019492 A1 | 1/2003 | Williams |
| 2005/0204934 A1 | 9/2005 | Robertson |
| 2005/0217659 A1 | 10/2005 | McClenahan |
| 2006/0016447 A1 | 1/2006 | Meyer |
| 2006/0042475 A1 | 3/2006 | Craig |
| 2006/0137676 A1 | 6/2006 | Barker |
| 2007/0163568 A1 | 7/2007 | Murray |
| 2007/0175467 A1 | 8/2007 | Liu |
| 2007/0277805 A1 | 12/2007 | Ho |
| 2008/0011285 A1 | 1/2008 | Milligan |
| 2009/0199839 A1 | 8/2009 | Hulsey |
| 2010/0024797 A1 | 2/2010 | Tsung |
| 2010/0083947 A1 | 4/2010 | Guillory |
| 2011/0079210 A1 | 4/2011 | Jackovitch |
| 2012/0216790 A1 | 8/2012 | Hopkins |
| 2012/0266857 A1 | 10/2012 | Lin |
| 2013/0061765 A1 | 3/2013 | Reinhart |
| 2013/0112088 A1 | 5/2013 | May |
| 2013/0298894 A1 | 11/2013 | Kleinsasser |
| 2014/0090634 A1 | 4/2014 | Li |
| 2014/0261012 A1 | 9/2014 | Perez, Jr. et al. |
| 2015/0047515 A1 | 2/2015 | Jenness |
| 2015/0047625 A1 | 2/2015 | Weil |
| 2015/0079250 A1 | 3/2015 | Ahmed |
| 2015/0144238 A1 | 5/2015 | Traeger |
| 2015/0265099 A1 | 9/2015 | Coffie |
| 2015/0305559 A1 | 10/2015 | Chung |
| 2017/0065124 A1 | 3/2017 | Colston |
| 2017/0067649 A1 | 3/2017 | Colston |

OTHER PUBLICATIONS

International Search Report for application No. PCT/US2016/051066 dated Dec. 8, 2016.
Combined Search Examnination Report for application No. GB1604584.1 dated Aug. 1, 2016.
amazon.com Inc., 2014, "The Original Bar-Be-Quick Build In Grill & Bake + Free pack of Beechwood smoking chips", amazon.co.uk, [online], Available from: https://www.amazon.co.uk/Original-Bar-Be-Wuick-Build-Beechwood-smoking/dp/B00IGUPK4C [Accessed Jul. 22, 2015].
International Search Report and Written Opinion for applciation No. PCT/US2015/046349 dated Dec. 28, 2015.
Non-Final Action mailed for U.S. Appl. No. 15/070,225 dated Feb. 23, 2018.
Non-Final Office Action for U.S. Appl. No. 29/539,822 dated Dec. 28, 2017.
Traeger Timberline 1300, by John R. Delaney, PCMag [online], published Aug. 4, 2017, [retreived on Dec. 21, 2017]. Retreived from the Internet, URL: https://www.pcmag.com/review/355354/traeger-timberline-1300.
Non-Final Office Action for U.S. Appl. No. 29/539,825 dated Dec. 28, 2017.
Non-Final Action mailed for U.S. Appl. No. 15/070,220 dated Sep. 6, 2018.

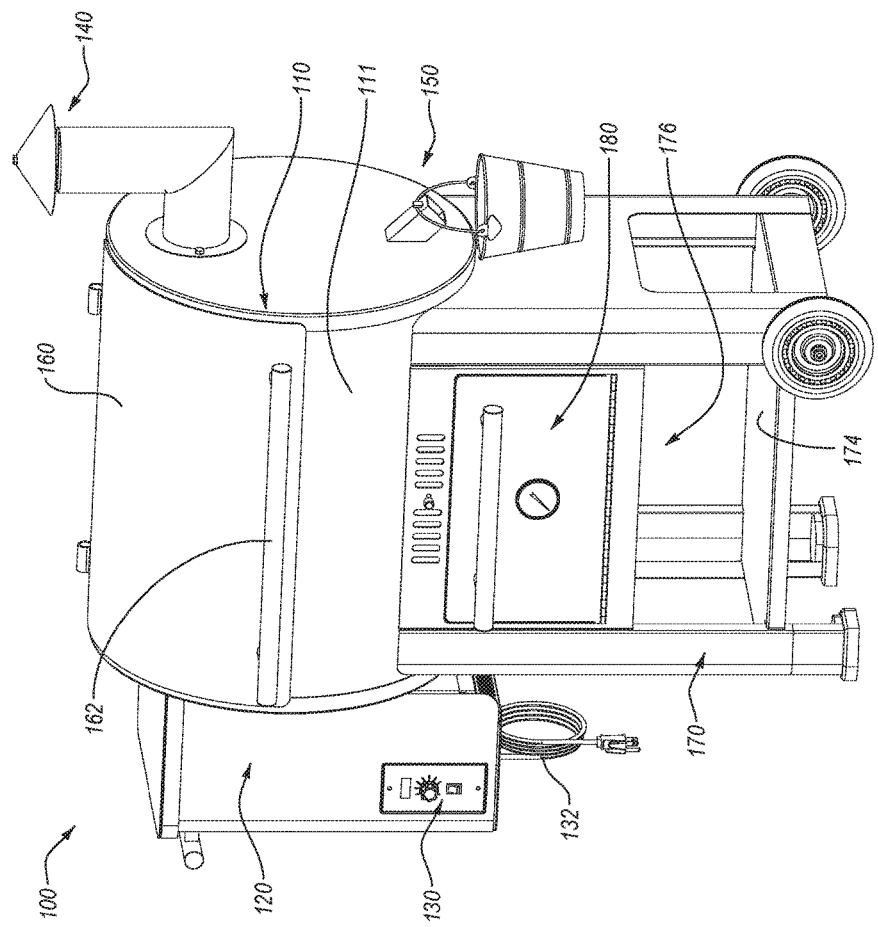

GRILLING DEVICE WITH WARMING CABINET

CROSS-REFERENCE TO RELATED APPLICATIONS

The present invention is a 35 U.S.C. § 371 U.S. National Stage of PCT PCT/US15/46349 filed Aug. 21, 2015, which claims the benefit of priority to U.S. Provisional Application No. 62/138,217, filed Mar. 25, 2015. The entire content of each of the foregoing patent applications is incorporated herein by reference.

BACKGROUND OF THE INVENTION

1. The Field of the Invention

The present disclosure relates to systems, methods, and devices for grilling and warming food products. In particular, the present disclosure relates to wood pellet-fired grilling devices and to systems and methods incorporating the same.

2. Background and Relevant Art

Grilling and warming food products typically include the use of a grilling device having a cooking section. The cooking section of such grilling devices is heated by means of a heat source, which is often disposed within the cooking section. Typical heat sources include electric filaments and combustible fuels, such as charcoal, wood, and gas (e.g., propane, butane, etc.). Outdoor combustion-style grills, in particular, have been developed to provide a convenient means for cooking food without the need for a traditional indoor oven or range.

Some grills may include adjustable heat settings designed to regulate temperature within the cooking section, thereby allowing a user to cook the food at a high heat and then reduce the temperature within the cooking section to maintain the food in a warm state until it is consumed. In some circumstances, however, a user may desire to continue cooking a first food product while maintaining a second, already cooked food product in a warm state; but without over-cooking or burning the second food product. In other circumstances, a user may desire to simultaneously prepare different types of food products, each requiring a different temperature and/or method of preparation. Because the single cooking section is maintained at a single temperature setting, however, the second food product may become over-cooked at a higher, cooking temperature setting or the first food product may not be thoroughly cooked at a lower, warming temperature setting. This can be inconvenient, time consuming, and can ruin one or both food products.

A variety of solutions have been presented to avoid the dilemma presented above. For instance, the second food product is often removed from the grilling device and covered to prevent heat loss. However, simply covering the food product may not maintain the desired (warm) temperature. Food products may also be transferred to a separate warming oven, such as a traditional indoor oven, to maintain a controlled separate temperature. However, laborious transfers of cooked food products may negate much of the ease and convenience of food grilling, and the separate warming oven may still over-cook the food if not designed to maintain a low, warming temperature.

In addition, some manufactures have developed grills with a raised cooking section rack to hold certain food products away from the heat source within the cooking section and thereby cook different food products at different temperatures or rates. However, food products can still become over-cooked on the raised rack as the heat circulating within the cooking section continues to raise the temperature or maintain a higher temperature of the food. Moreover, monitoring and orchestrating the precise timing appropriate for moving the cooking food to the raised rack can detract from the ease of food grilling.

Some specialty grilling devices provide a second cooking section having a second heating source disposed therein. While such grilling devices may overcome certain problems associated with the need to simultaneously cook and warm different food products, or to cook different food products at different temperatures or rates, such grilling devices may consume twice the fuel used in operating the heat source. Thus, a user is left to sacrifice efficiency for the sake of convenience.

Accordingly, there are a number of disadvantages in existing grilling devices and systems that can be addressed. It would, therefore, be beneficial to provide a grilling device or system that includes an efficient mechanism for simultaneously cooking a first food product at a higher temperature and warming a second food product at a lower temperature or for cooking, preparing, and/or maintaining two food products at different temperatures.

BRIEF SUMMARY OF THE INVENTION

Embodiments of the present disclosure solve one or more of the foregoing or other problems in the art with improved systems, methods, and devices for grilling. In particular, certain implementations of the present disclosure relate to improved grills, as well as components and/or sub-components thereof and/or systems, methods, and apparatus incorporating the same. Some implementations of the present disclosure relate to grills having an oven section in thermal communication with a warming cabinet. The oven section can be heated directly by a heating mechanism optionally disposed at least partially therein. The heating mechanism can include a heating component (such as a fire pot) where a fuel source (such as wood pellets) can be ignited and burned to produce heat at one or more temperature settings. The warming cabinet, on the other hand, can be heated indirectly and/or can be devoid of a combustion fuel or other (separate) heat source, and can instead be warmed (passively and/or actively) by heat from and/or produced in the oven section.

Some embodiments of the present disclosure include a partition disposed between the oven section and the warming cabinet, the partition being configured to provide ample thermal communication between the oven section and the warming cabinet. For instance, the oven section can comprise an outer wall comprised of a thermally conductive material, the warming section being configured to be heated through the outer wall. In an embodiment, heat from and/or generated in the oven section can be transferred through the outer wall (e.g., via conduction) and into the warming cabinet (e.g., via radiation). In at least one embodiment, a heat shield is not disposed between the oven section and the warming cabinet. In one or more embodiments, the warming cabinet can be disposed below and/or share a wall with the oven section. For instance, a lower portion of the outer wall can comprise and/or serve as an upper portion or ceiling of the warming cabinet in certain embodiments. The warming section can, therefore, be configured to be heated through the underside of the oven section.

In one or more embodiments, the grill and/or heating mechanism thereof can also include an air moving element, such as a fan or blower, configured to provide air to the heating component during fuel source ignition and/or burning. The air moving element can also move heated air from the oven section into the warming cabinet. For instance, the air moving element can move air through a heating path in communication with the warming cabinet. The heating path can run past a heat sink configured to draw heat from the oven section into the warming cabinet. Thus, the moved air can be warmed as it passes through the heating path and into the warming cabinet. Accordingly, heat from the oven section can be transferred (i) passively (via conduction, radiation, and/or (natural) convection) through the partition or dividing wall and into the warming cabinet, and/or (ii) actively (via forced air convection, conduction, radiation, and/or natural convection) as the air moving element forces air past the optional heat sink and/or other heating component(s) and into the warming cabinet. Accordingly, the warming cabinet can be in thermal communication with the oven section through a variety of means.

In at least one embodiment, the warming cabinet can have one or more venting elements. The one or more venting elements can include at least one permanent venting element (e.g., disposed in a lower portion of the warming cabinet (or internal warming compartment thereof)) and/or at least one selectable venting element (e.g., disposed in an upper portion of the warming cabinet (or internal warming compartment thereof)). The permanent venting element can provide: (i) a (constant) source of cool and/or fresh air into the warming cabinet (or internal warming compartment thereof); and/or (ii) an exit for hot air to escape from the warming cabinet (or internal warming compartment thereof).

The selectable venting element can comprise a louver and/or can be selectively adjustable between a closed position and one or a plurality of open positions. In the closed position, for example, operation of the heating mechanism and the air moving element can introduce warmer air into the upper portion of the warming cabinet (or internal warming compartment thereof) and can force cooler air in the bottom portion of the internal warming compartment out through the optional permanent venting element. In the one or plurality of open positions, however, operation of the heating mechanism and the air moving element can force warmer air in the upper portion of the internal warming compartment out through the selectable venting element as cooler air is introduced into the lower portion of the internal warming compartment through the optional permanent venting element. Accordingly, the amount of warmer air forced out of the internal warming compartment and/or the amount of cooler air introduced into the internal warming compartment can be directly proportional to the degree to which the selectable venting element is opened.

Certain embodiments also include a plurality of support members to support the oven section and/or warming cabinet (e.g., above the ground, floor, or other support structure). Certain embodiments also include a utility shelf or rack (e.g., disposed below the warming cabinet and a utility space disposed between the utility shelf and the bottom of the warming cabinet).

In addition, one or more embodiments of the present disclosure can include methods of warming a food product by: adding a food product to a warming cabinet; igniting a fuel source configured to heat the oven section upon ignition, a portion of the heat produced therefrom being transmitted to the warming cabinet, the warming cabinet being in thermal communication with the oven section; and warming the food product in the warming cabinet. The structural elements and operations described above (and in further detail below) can be implemented in various combinations to control the temperature within the oven section and within the warming cabinet. In particular, the heating mechanism and air moving element can be operated in coordination with the venting element(s) in order to maintain a temperature of the food product, the warming cabinet being maintained at a temperature lower than a temperature of the oven section and higher than an ambient temperature outside the warming cabinet.

In addition, certain embodiments of the present disclosure can include methods of warming and/or cooking a food product by: adding a food product to an oven section of a grill; igniting a fuel source configured to heat the oven section upon ignition, a portion of the heat produced therefrom being transmitted to a warming cabinet in thermal communication with the oven section (optionally, without an intervening heat shield); warming or cooking the food product in the oven section; and moving the food product from the oven section to the warming cabinet in order to maintain a temperature of the food product.

Additional features and advantages of exemplary implementations of the present disclosure will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the present disclosure can be obtained, a more particular description of the implementations briefly described above will be rendered by reference to specific implementations and/or embodiments thereof which are illustrated in the appended drawings. For better understanding, the like elements have been designated by like reference numbers throughout the various accompanying figures. Understanding that these drawings depict only typical implementations and/or embodiments of the invention and are not therefore to be considered to be limiting of its scope, the invention will be described and explained with additional specificity and detail through the use of the accompanying drawings in which:

FIG. 1A illustrates a front perspective view of a grill according to an embodiment of the present disclosure;

DETAILED DESCRIPTION OF THE PREFERRED EMBODIMENTS

Figure 1B:
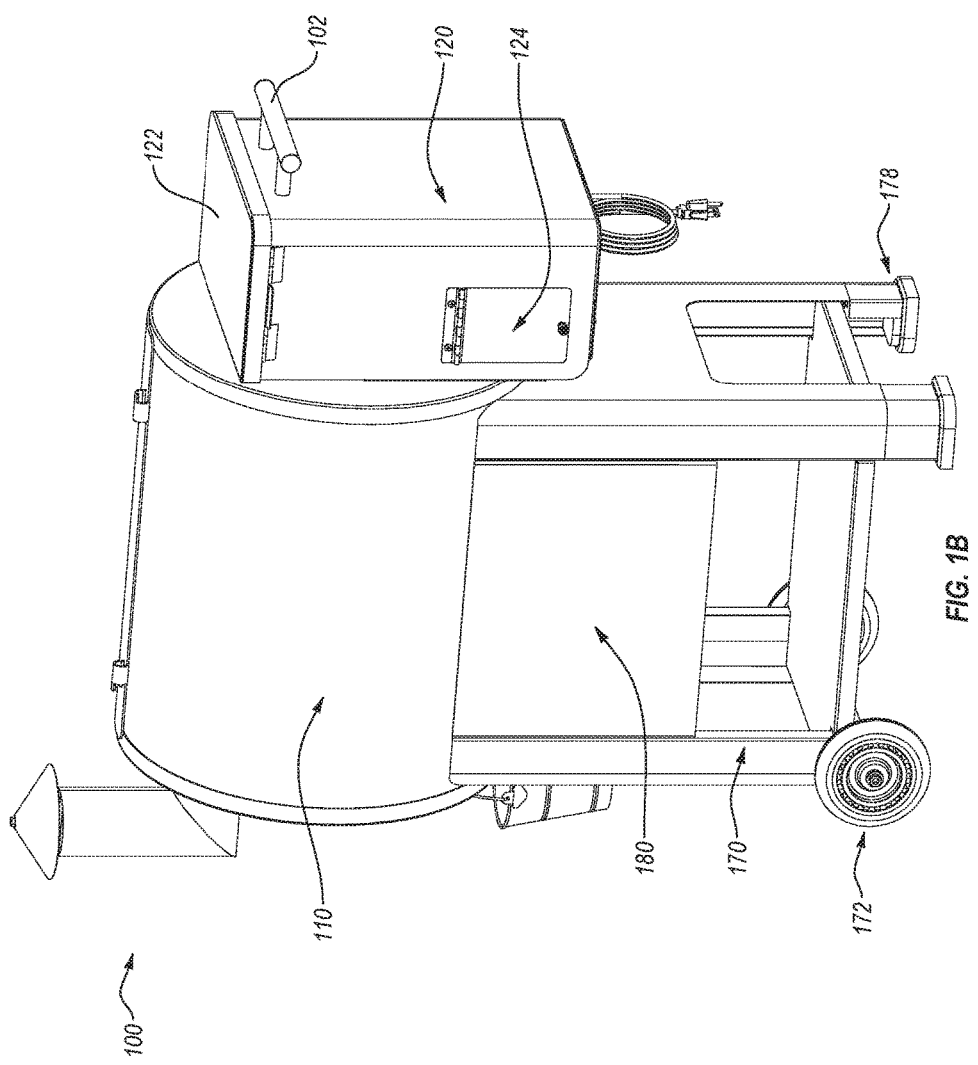
FIG. 1B illustrates a rear perspective view of the grill of FIG. 1A.

Before describing the present disclosure in detail, it is to be understood that this disclosure is not limited to the specific parameters of the particularly exemplified systems, apparatus, assemblies, products, devices, kits, methods, and/or processes, which may, of course, vary. It is also to be understood that much, if not all of the terminology used herein is only for the purpose of describing particular embodiments of the present disclosure, and is not necessarily intended to limit the scope of the disclosure in any particular manner. Thus, while the present disclosure will be described in detail with reference to specific configurations, embodiments, and/or implementations thereof, the descriptions are illustrative only and are not to be construed as limiting the scope of the claimed invention Various aspects of the present disclosure, including devices, systems, methods, etc., may be illustrated with reference to one or more exemplary embodiments or implementations. As used herein, the terms "exemplary embodiment" and/or "exemplary implementation" mean "serving as an example, instance, or illustration," and should not necessarily be construed as preferred or advantageous over other embodiments or implementations disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

Furthermore, unless defined otherwise, all technical and scientific terms used herein have the same meaning as commonly understood by one of ordinary skill in the art to which the present disclosure pertains. While a number of methods, materials, components, etc. similar or equivalent to those described herein can be used in the practice of the present disclosure, only certain exemplary methods, materials, components, etc. are described herein.

It will be noted that, as used in this specification and the appended claims, the singular forms "a," "an" and "the" include plural referents unless the content clearly dictates otherwise. Thus, for example, reference to a "column" includes one, two, or more columns. Similarly, reference to a plurality of referents should be interpreted as comprising a single referent and/or a plurality of referents unless the content and/or context clearly dictate otherwise. Thus, reference to "columns" does not necessarily require a plurality of such columns. Instead, it will be appreciated that independent of conjugation; one or more columns are contemplated herein.

As used throughout this application the words "can" and "may" are used in a permissive sense (i.e., meaning having the potential to), rather than the mandatory sense (i.e., meaning must). Additionally, the terms "including," "having," "involving," "containing," "characterized by," as well as variants thereof (e.g., "includes," "has," and "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

Various aspects of the present disclosure can be illustrated by describing components that are coupled, attached, connected, and/or joined together. As used herein, the terms "coupled", "attached", "connected," and/or "joined" are used to indicate either a direct association between two components or, where appropriate, an indirect association with one another through intervening or intermediate components. In contrast, when a component is referred to as being "directly coupled", "directly attached", "directly connected," and/or "directly joined" to another component, no intervening elements are present or contemplated. Thus, as used herein, the terms "connection," "connected," and the like do not necessarily imply direct contact between the two or more elements. In addition, components that are coupled, attached, connected, and/or joined together are not necessarily (reversibly or permanently) secured to one another. For instance, coupling, attaching, connecting, and/or joining can comprise placing, positioning, and/or disposing the components together or otherwise adjacent in some implementations.

As used herein, directional and/or arbitrary terms, such as "top," "bottom," "front," "back," "forward," "rear," "left," "right," "up," "down," "upper," "lower," "inner," "outer," "internal," "external," "interior," "exterior," "anterior," "posterior," "proximal," "distal," and the like can be used only for convenience and/or solely to indicate relative directions and/or orientations and may not otherwise be intended to limit the scope of the disclosure, including the specification, invention, and/or claims. Accordingly, such directional and/or arbitrary terms are not to be construed as necessarily requiring a specific order or position.

To facilitate understanding, like reference numerals have been used, where possible, to designate like elements common to the figures. Furthermore, alternative configurations of a particular element may each include separate letters appended to the element number. Accordingly, an appended letter can be used to designate an alternative design, structure, function, implementation, and/or embodiment of an element or feature without an appended letter. Similarly, multiple instances of an element and or sub-elements of a parent element may each include separate letters appended to the element number. In each case, the element label may be used without an appended letter to generally refer to instances of the element or any one of the alternative elements. Element labels including an appended letter can be used to refer to a specific instance of the element or to distinguish or draw attention to multiple uses of the element. However, element labels including an appended letter are not meant to be limited to the specific and/or particular embodiment(s) in which they are illustrated. In other words, reference to a specific feature in relation to one embodiment should not be construed as being limited to applications only within said embodiment.

It will also be appreciated that where two or more values, or a range of values (e.g., less than, greater than, at least, and/or up to a certain value, and/or between two recited values) is disclosed or recited, any specific value or range of values falling within the disclosed values or range of values is likewise disclosed and contemplated herein. Thus, disclosure of an illustrative measurement or distance less than or equal to about 10 units or between 0 and 10 units includes, illustratively, a specific disclosure of: (i) a measurement of 9 units, 5 units, 1 units, or any other value between 0 and 10 units, including 0 units and/or 10 units; and/or (ii) a measurement between 9 units and 1 units, between 8 units and 2 units, between 6 units and 4 units, and/or any other range of values between 0 and 10 units.

Various modifications can be made to the illustrated embodiments without departing from the spirit and scope of the invention as defined by the claims. Thus, while various aspects and embodiments have been disclosed herein, other aspects and embodiments are contemplated. It is also noted that systems, apparatus, assemblies, products, devices, kits, methods, and/or processes, according to certain embodiments of the present disclosure may include, incorporate, or otherwise comprise properties, features, components, members, and/or elements described in other embodiments disclosed and/or described herein. Thus, reference to a specific feature in relation to one embodiment should not be construed as being limited to applications only within said embodiment.

The headings used herein are for organizational purposes only and are not meant to be used to limit the scope of the description or the claims.

Embodiments of the present disclosure include systems, methods, and devices for grilling. In particular, certain implementations of the present disclosure relate to improved grills, as well as components and/or sub-components thereof and/or systems, methods, and apparatus incorporating the same. Some implementations of the present disclosure relate to grills having an oven section in thermal communication with a warming cabinet. The oven section can include a heating component (such as a fire pot) where a fuel source (such as wood pellets) can be ignited to produce heat at one or more temperature settings. The warming cabinet, on the other hand, can be devoid of a combustion fuel or other (separate) heat source and can instead be warmed (passively and/or actively) by heat from and/or produced in the oven section.

It will be appreciated that while reference is made to "grills," "grilling devices," "grilling systems," and the like, the present disclosure extends to smokers, bakers, roasters, braisers, barbeques, and other devices and systems for warming, cooking, and/or preparing food products. It will also be appreciated that while reference is made to a "warming cabinet," or "warming section," the present disclosure extends to warming areas of various configurations and structures, including drawers, bins, basins, canisters, boxes, receptacles, and other areas suitable for warming a food product. Likewise, while reference is made to an "oven section," "cooking section," "heating area," and the like, the present disclosure also extends to various spaces suitable for heating, including open grilling surfaces (e.g., exposed to ambient air), closed kilns and ovens, heating spaces that can be selectively opened and closed, and the like. Accordingly, the particular features, configurations, design characteristics, and/or component (assemblies) described herein can be applicable to a variety of different fields of use extending beyond cooking or otherwise preparing food products. These different fields of use are also contemplated herein. Thus, reference to one or more "grills," "grilling devices," "grilling systems," and the like, or one or more components thereof, should not be construed as being limited only to applications involving food grilling devices.

Grills of the present disclosure can be heated using a variety of fuels. For example, the disclosure extends to grills configured to burn propane and/or natural gas and grills configured to burn solid fuel (e.g., charcoal, briquettes, wood, etc.). In some embodiments, the grill is configured to use wood pellets as fuel. In addition, in some embodiments, grills according to the present disclosure are configured to be moveable (e.g., by means of wheels or other moving elements). In other embodiments, grills may be configured as stationary appliances and/or may be installed in a relatively permanent fashion (e.g., bolted or otherwise fastened to a wall and/or floor, or otherwise installed as part of a kitchen or cooking area). Furthermore, grills according to the present disclosure can be configured for outdoor use in some embodiments. For instance, certain regulations and/or safety concerns may require and/or recommend the use of combustion-style grills only in outdoor, open-air areas, away from structures, vegetation, and/or other potentially flammable materials.

In addition, certain embodiments may be described with reference to one or more metals or metal materials. As used herein, the term "metal" refers to a material that comprises an elemental metal or metal alloy, blend, or combination. Certain embodiments may also refer to thermal conductivity and/or thermal communication. As used herein, "thermal communication" refers to contact sufficient to transfer heat (e.g., efficiently and/or without deliberate inhibition) from one area or material to another. For instance, two materials in thermal communication may be placed in direct contact (e.g., positioned directly together) without an intervening heat shield or other heat transfer inhibiting element. Alternatively, two areas in thermal communication may be separated only or primarily by thermally conductive materials, as understood by those skilled in the art, without an intervening heat shield or other heat transfer inhibiting element.

It is further to be understood that some of the drawings included herewith, and which are referenced herein, are diagrammatic, schematic, and other representations of example embodiments, and are not limiting on the present disclosure. Moreover, while various drawings are provided at a scale that is considered functional for some embodiments, the drawings are not necessarily drawn to scale for all contemplated embodiments. No inference should therefore be drawn from the drawings as to the necessity of any scale. Rather, the proportionality, scale, size, shape, form, function, and/or other feature of the disclosed embodiments can be altered without necessarily departing from the scope of this disclosure (unless such feature is expressly described herein as essential).

Furthermore, as indicated above, in the exemplary embodiments illustrated in the figures, like structures will be provided with similar reference designations, where possible. Specific language will be used herein to describe the exemplary embodiments. Nevertheless it will be understood that no limitation of the scope of the disclosure is thereby intended. Rather, it is to be understood that the language used to describe the exemplary embodiments is illustrative only and is not to be construed as limiting the scope of the disclosure (unless such language is expressly described herein as essential).

Alterations and further modifications of the inventive features illustrated herein, and additional applications of the principles illustrated herein, which would occur to one skilled in the relevant art and having possession of this disclosure, are to be considered within the scope of this disclosure. Unless a feature is described as requiring another feature in combination therewith, any feature herein may be combined with another feature of a same or different embodiment disclosed herein. Furthermore, various well-known aspects of illustrative systems, methods, apparatus, and the like are not described herein in particular detail in order to avoid obscuring aspects of the example embodiments.

Reference will now be made to the figures to describe various aspects of example embodiments of the disclosure. FIGS. 1A and 1B illustrate front and rear perspective views, respectively, of a grill 100 according to one embodiment of the present disclosure. Those skilled in the art will appreciate that grill 100 can be or comprise a wood pellet grill in one or more embodiments. Accordingly, as described herein, reference may be made to various features specific to such wood-fired pellet grills. It is noted, however, that such references should not be construed as limiting the present disclosure to application only within the field of wood or other pellet grills.

Grill 100 generally includes an oven section 110 configured for cooking, heating, and/or otherwise preparing one or more food products therein and a warming section (or warming cabinet) 180 in thermal communication with oven section 110 such that at least some of the heat produced in or transmitted to the oven section 110 is or can be transmitted to the warming cabinet 180. As depicted in the illustrated embodiments, warming cabinet 180 is disposed below the oven section 110. However, a variety of alternative positions and/or configurations (e.g., atop, beside, etc.) are also contemplated herein.

Figure 2:
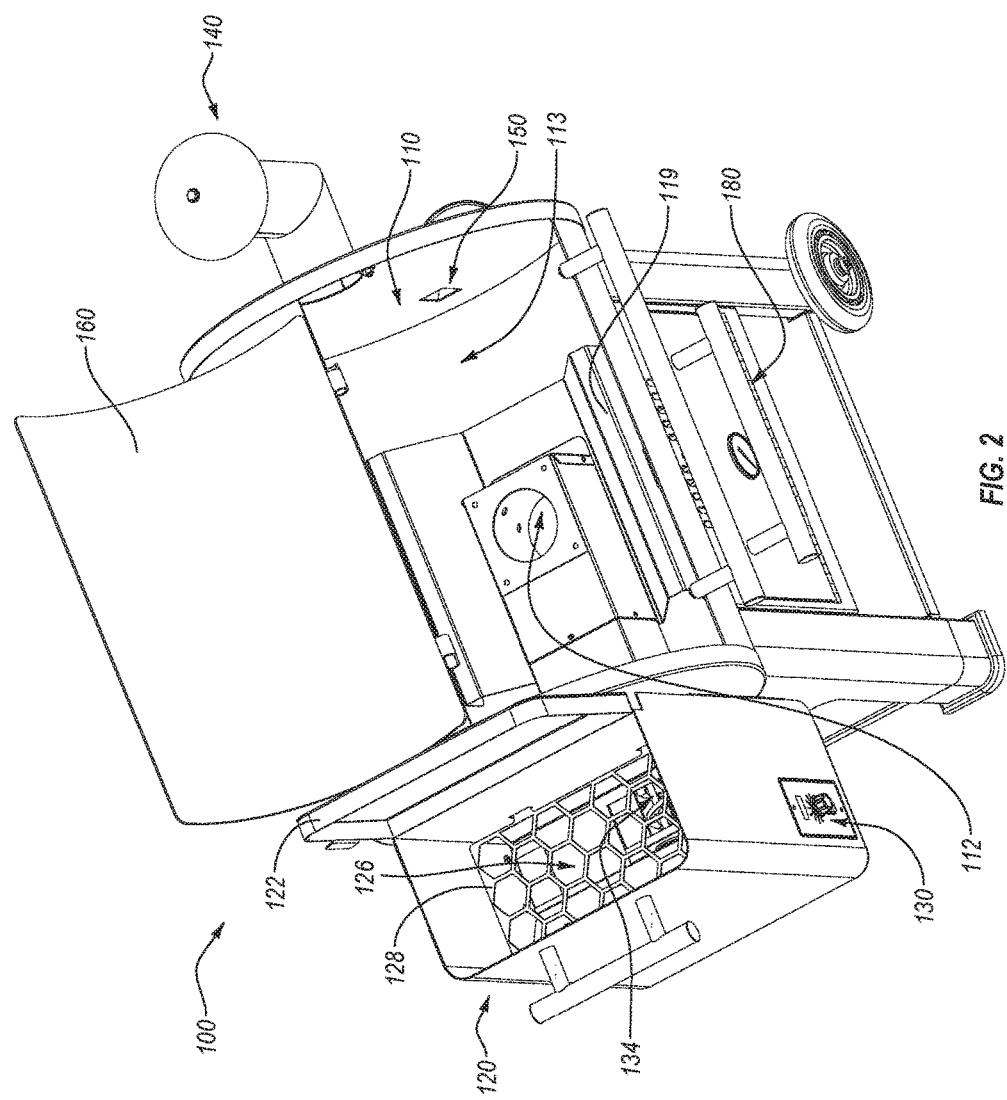
FIG. 2 illustrates a top perspective view of the grill of FIG. 1A in a first opened configuration.
Figure 4:
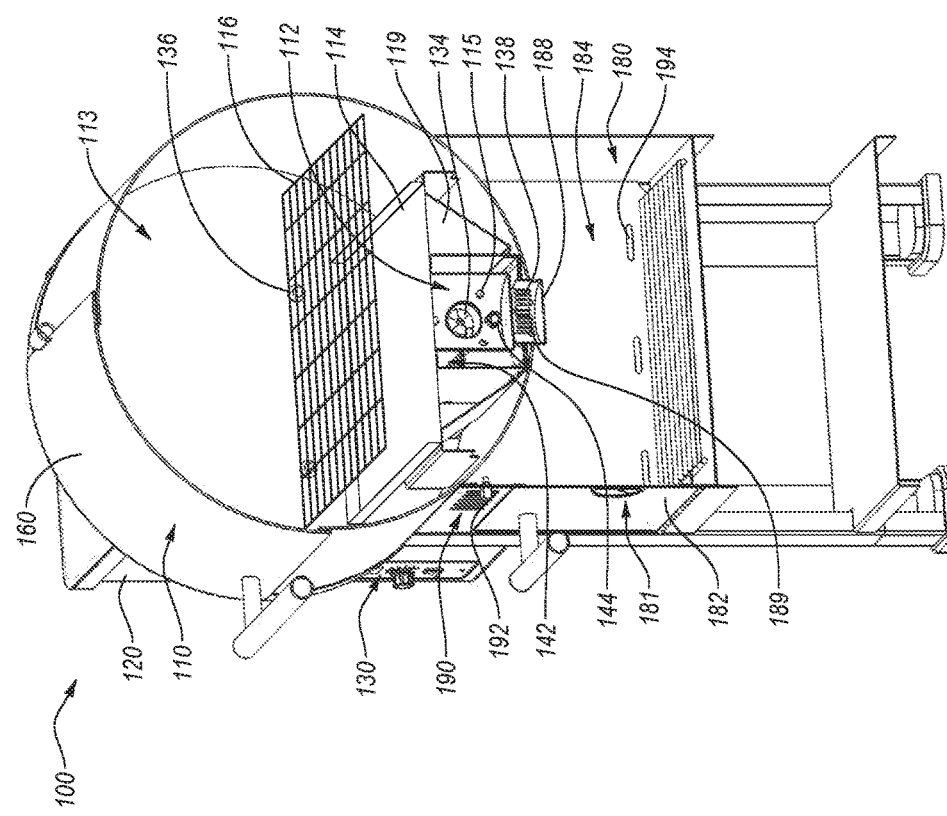
FIG. 4 illustrates a perspective, side cross-sectional view of the grill of FIG. 1A.

Oven section 110 has an (encircling) outer wall 111 at least partially bounding an interior portion (see internal oven compartment 113 as illustrated in FIGS. 2 and 4) and a lid 160 for accessing the interior portion. Lid 160 can be actuated using handle 162. Oven section 110 can be formed in a cylindrical, barrel-like shape, with a circular cross-section, as in the illustrated embodiment. In other embodiments, however, oven section 110 can be formed in other shapes and with other sizes. For example, oven section 110 can have a substantially rectangular or other (polygonal) cross-sectional (e.g., horizontal or vertical) shape.

As recognized by those skilled in the art, a user generally prepares food products for consumption by cooking the food products within the interior portion of oven section 110. Accordingly, grill 100 can also include a heating mechanism for heating the interior portion of the oven section 110. In particular, grill 100 includes a controller 130 configured to control the temperature inside the oven section 110. Controller 130 can operate by means of an optional power cord 132 in certain embodiments. Those skilled in the art will appreciate, however, that controller 130 can alternatively be operated by other means, including one or more batteries, solar power, mechanical power, etc. Grill 100 also includes smoke exhaust (or chimney) 140 and/or an oil/grease outlet 150 (disposed in and/or extending from outer wall 111 of oven section 110).

Grill 100 also includes a utility shelf 174 disposed below the warming cabinet 180. In some embodiments, utility shelf 174 is disposed a distance below the bottom-most portion of the warming cabinet 180 in order to define a utility space 176 between the warming cabinet 180 and the utility shelf 174. Utility space 176 can be open, providing easy access to accessories, ingredients, and/or other parts or items that may be placed on utility shelf 174. In certain embodiments, utility shelf 174 has substantially the same linear (footprint) area as the warming cabinet 180 and/or is in substantial vertical alignment with warming cabinet 180. In other embodiments, however, utility shelf 174 can have a larger or smaller footprint than warming cabinet 180 and/or may not be in vertical alignment. Though only one utility shelf is illustrated, one will recognize that two, three, four, or more such utility shelves may also be included in some embodiments.

As illustrated in FIGS. 1A-1B, utility shelf 174 and warming cabinet 180 can be proportioned such that utility space 176 has a height that is about one half the height of warming cabinet 180 (e.g., the distance between utility shelf 174 and the bottom of warming cabinet 180 is about 50% of the distance between the bottom of warming cabinet 180 and the top of warming cabinet 180). In other embodiments, the height of utility space 176 can be about 25% of the height of warming cabinet 180, or about 33%, or about 66%, or about 75% of the height of warming cabinet 180. In yet other embodiments, utility space 176 and warming cabinet 180 can have a height that is substantially equal, and in other embodiments, the height of warming cabinet 180 can be less than the height of the utility space 176 (e.g., about 75%, 66%, 50%, 33%, or 25% of the height of utility space 176).

FIGS. 1A-1B also illustrate that the grill 100 can be supported by one or more support members 170. Support members 170 can comprise legs or posts in some embodiments. As depicted, support members 170 can also include one or more wheels 172 to provide mobility to the grill 100 and one or more footings 178 to restrict mobility. A handle 102 can also be provided to maneuver grill 100. As illustrated in FIGS. 1A-1B, oven section 110 is disposed substantially above opposing support members 170, each comprising opposing legs. Similarly, warming cabinet 180 is disposed substantially between the opposing support members 170. In certain embodiments, oven section 110 can be coupled to or integrally joined with top surfaces of the respective support members 170, while warming cabinet 180 can be coupled to or integrally joined with horizontal facing surfaces of the respective support members 170.

As depicted more fully in FIG. 2, and with continued reference to FIGS. 1A-1B, grill 100 can also include a hopper 120 (e.g., as part of the heating mechanism). Hopper 120 can be disposed on one side of the oven section 110 or can be disposed elsewhere without necessarily departing from the scope of this disclosure. In certain embodiments, hopper 120 is configured to hold a fuel source (e.g., in some embodiments, wood pellets). For instance, as illustrated in FIG. 2, lid 122 of hopper 120 can be lifted to expose an inner compartment 126. Inner compartment 126 can comprise a chute-shaped interior and can be configured to hold the fuel source prior to use. Disposed within inner compartment 126 is a grating member 128 designed to regulate the size of the fuel source. For instance, grating member 128 may be useful for embodiments of the present disclosure that utilize wood pellets as a fuel source. Specifically, grating member 128 can separate wood pellets that have been clumped together during storage.

Disposed in the bottom of the inner compartment 126 is a conveyance mechanism 134. In certain embodiments, conveyance mechanism 134 can comprise an auger configured to transport the wood pellets or other fuel source from hopper 120 to a heating component, such as a burning zone 112, where the fuel source can be ignited to produce heat for grill 100. In at least one aspect, controller 130 can be configured to adjust the speed of conveyance mechanism 134. In some embodiments, a higher control setting can deliver the fuel source to burning zone 112 more quickly, thereby generating more heat. A lower control setting, on the other hand, may lead to the generation of a lower amount of heat and/or may allow food products in oven section 110 to be smoked. Intermediate control settings are also contemplated herein. In certain embodiments, and as discussed in further detail below, controller 130 can also be configured to adjust one or more air supply elements to facilitate proper ignition and/or burning of the fuel source within burning zone 112. In certain embodiments, hopper 120 may be emptied by opening an access opening 124 (see FIG. 1B).

As illustrated in FIG. 2, burning zone 112 can comprise a firepot having an internal cavity for retaining the burning fuel source. In at least one embodiment, burning zone 112 can be disposed at least partially within an internal oven compartment 113 of oven section 110. Accordingly, heat generated through the burning of the fuel source in burning zone 112 can escape directly into internal oven compartment 113. Thus, oven section 110 and/or internal oven compartment 113 thereof can be heated directly by the heating mechanism, burning zone 112, and/or the fuel source burning therein. In alternative embodiments, however, heat generated in burning zone 112 can be transferred and/or transmitted into internal oven compartment 113 without necessarily departing from the scope of this disclosure.

As indicated above, smoke or exhaust generated within internal oven compartment 113 can escape through smoke exhaust 140, which includes an opening disposed in outer wall 111 of oven section 110. One or more supporting members 119 can also be disposed within internal oven compartment 113. Turning briefly to FIG. 4, supporting members 119 can be configured to support a panel 114 disposed thereon. In at least one aspect, the panel 114 can comprise an oil/grease collection means (e.g., pan, channel, etc.) configured to catch and direct (i.e., channel) oil or grease produced from cooking food products within internal oven compartment 113 toward oil/grease outlet 150. The oil/grease outlet 150 can include a connector (e.g., hook, clip, hanger, clasp, or other fastener) for attaching a bucket or other container to collect the oil/grease passed through the outlet 150 in some embodiments. In another aspect, panel 114 can comprise a heat distribution panel configured to receive heat from the burning zone 112 and distribute the heat more fully throughout the oven section 110. With continued reference to FIG. 4, oven section 110 can also include one or more food product racks 116 for placing food to be smoked, heated, cooked, etc. Food product racks 116 can be supported within internal oven compartment 113 by means of one or more racks supporting elements 136.

Figure 3A:
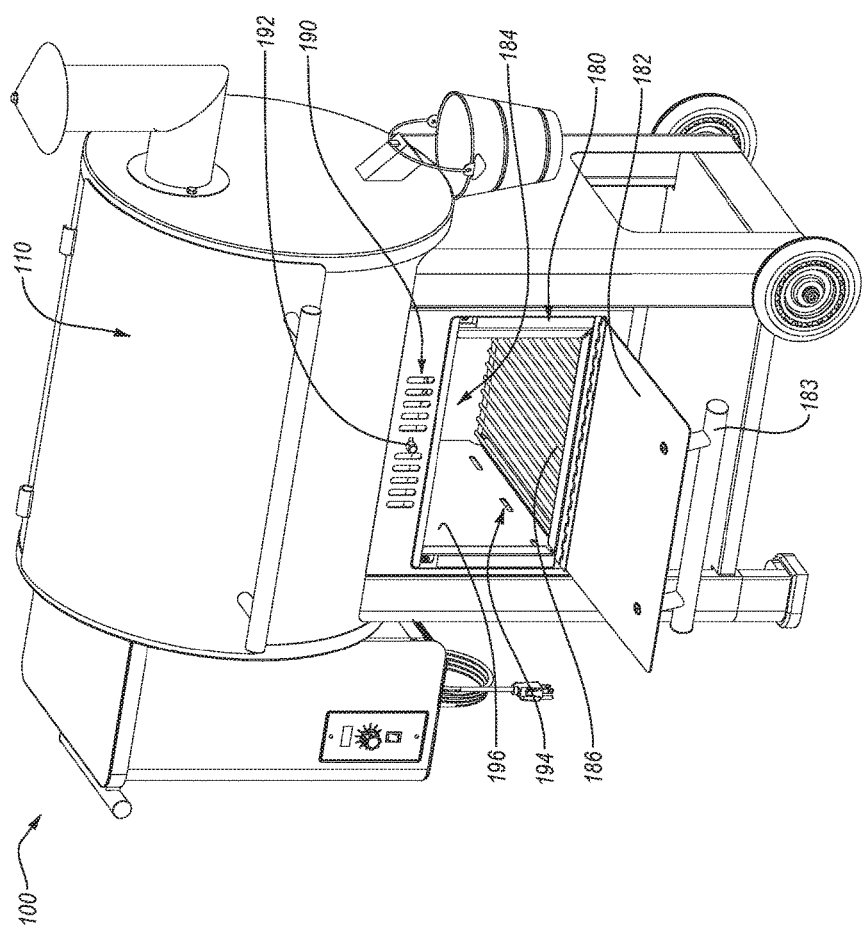
FIG. 3A illustrates a top perspective view of the grill of FIG. 1A in a second opened configuration.
Figure 3B:
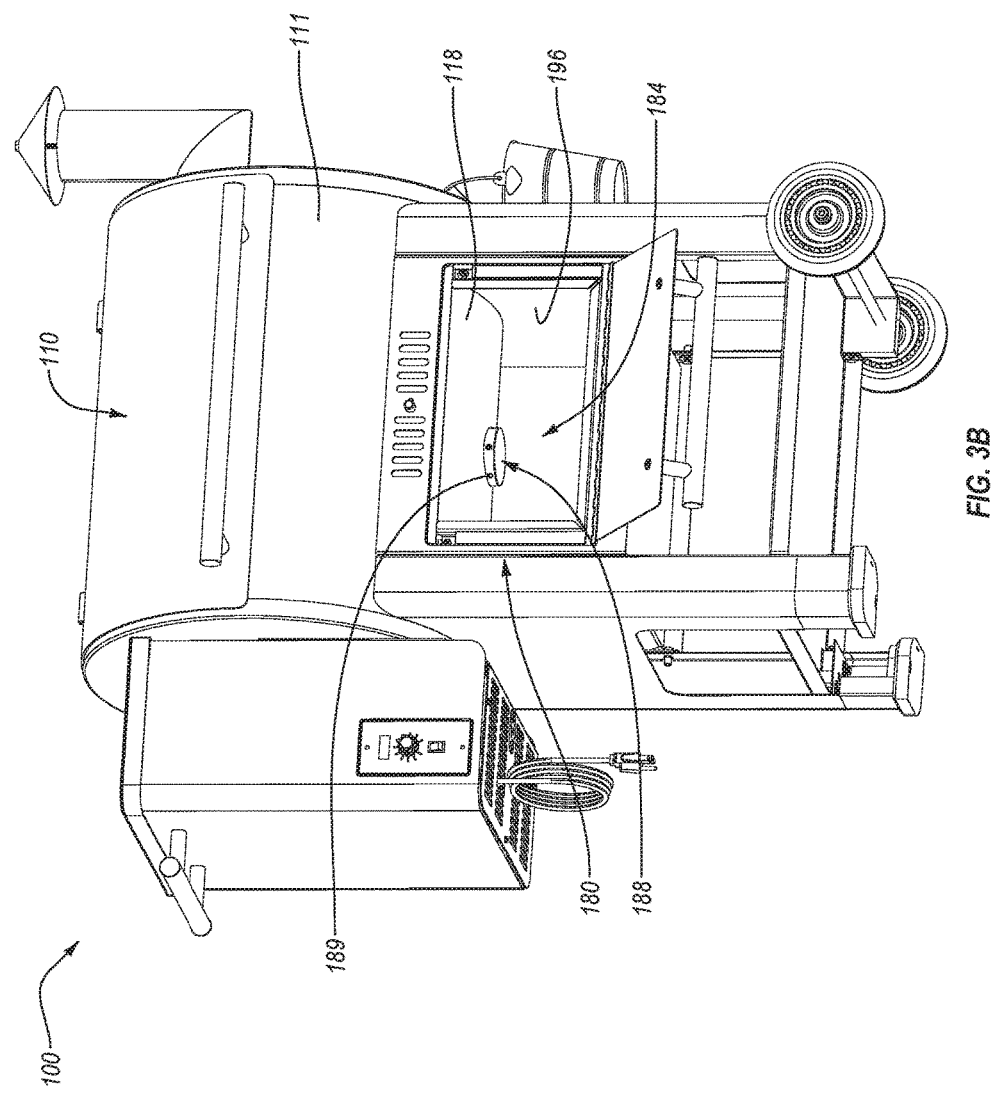
FIG. 3B illustrates a bottom perspective view of the grill of FIG. 3A.

In one or more embodiments, outer wall 111 can separate oven section 110 from warming cabinet 180. As illustrated in FIGS. 3A-3B, warming cabinet 180 can include a door 182. Door 182 can be disposed on a front side of the grill 100, and can be configured to open outwardly and downwardly. In other embodiments, door 182 can be configured in different orientations and for different actuation. For example, the door 182 can be configured to swing open to one side or the other, or to swing open upwards. In some embodiments, the door 182 can be configured to swing inwards. Some embodiments may include more than one door, such as a pair of doors configured to open and close in a double-leaf-door fashion. Further embodiments can include a slide door positionable by sliding in one direction or another. Door 182 can also include a handle 183 in some embodiments.

By actuating door 182, warming cabinet 180 can be opened, revealing an interior space or internal warming compartment 184 at least partially bound by a side wall 196. Internal warming compartment 184 can include a rack 186 for holding food products or other items. Though only one rack 186 is shown in the illustrated embodiment, other embodiments may include more than one rack (two, three, four, or more), or may omit racks. When multiple racks are used, racks 186 may be the same or different in size and shape. In addition, racks 186 may be configured to be removable, or may be positioned in a permanent fashion.

In at least one embodiment, (at least partially encircling) sidewall 196 can have one or more venting elements 194 disposed therein. As depicted in FIG. 3A, for instance, a side portion of side wall 196 has three permanent vents 194 disposed therein and/or extending therethrough. These permanent vents 194 are disposed in a bottom portion of internal warming compartment 184 and/or sidewall 196. Warming cabinet 180 can also include one or more additional venting elements 190. In at least one embodiment, venting element 190 can comprise a louver and/or adjustable venting element configured for selectable opening and closing. Selectable venting element 190 can include a selecting member 192 for selectively opening and closing venting element 190. As depicted in the illustrated embodiments, selectable venting element 190 can be disposed in an upper portion of warming cabinet 180 and/or sidewall 196 thereof.

FIG. 3B shows additional details of the upper portion of warming cabinet 180. In particular, FIG. 3B illustrates that oven section 110 and warming cabinet 180 can be separated by a partition 118. In the illustrated embodiment, the partition 118 is an integral part of the cylindrical, barrel-shaped outer wall 111 of oven section 110. Accordingly, partition 118 has a downwardly rounded, convex, and/or curved configuration which extends into internal warming compartment 184. Thus, while sidewall 196 of warming cabinet 180 comprises a plurality of sides and/or bottom, etc., the top of warming cabinet 180 can be formed by the bottom portion of outer wall 111.

In other embodiments, however, partition 118 can have or be formed in other configurations. For instance, partition 118 can be an integral part of sidewall 196 of warming chamber 180 or can be an independent component positioned between oven section 110 and warming cabinet 180, but not integral to either. In addition, partition 118 can have other sizes and shapes. For example, partition 118 can extend upwardly, into oven section 110 (or internal oven compartment 113 thereof) in a convex fashion, such that partition 118 has a concave configuration in warming cabinet 180 and/or internal warming compartment 184 thereof. Alternatively, partition 118 can be substantially flat and/or can have ridges, grooves, perforations, and other configurations.

Partition 118 can be configured to provide physical separation between oven section 110 and warming cabinet 180, while also providing ample thermal communication therebetween. Accordingly, in some preferred embodiments, the partition 118 omits heat-shielding and heat-blocking materials. Instead, partition 118 can be formed of a heat conductive material such as metal, metal alloy, and/or metal blend. Regardless of material and/or configuration, partition 118 can be configured to permit the transfer of heat from oven section 110 into warming cabinet 180 through one or more heat transfer mechanisms. For instance, partition 118 may conduct heat and, therefore, allow heat from oven section 110 (and/or internal oven compartment 113 thereof) to radiate into warming cabinet 180 (and/or internal warming compartment 184 thereof).

Partition 118 can provide the advantages and/or benefits of allowing a user to maintain at least two separate zones of elevated temperatures. For example, a user can set and/or adjust the temperature of oven section 110 at a level for cooking a food product. Because partition 118 provides a physical separation between the internal oven compartment 113 and internal warming compartment 184, the temperature in warming section 180 can be raised to a level above ambient (outside) temperature, but not as high as the temperature in the oven section 110. Accordingly, food products cooked or otherwise prepared in oven section 110 can be placed in warming cabinet 180 to maintain a temperature above ambient, but not so high as to overcook or burn the food product.

In another example, a user can place certain types of food products requiring a higher temperature for proper preparation in oven section 110 while simultaneously preparing other types of food products requiring a lower temperature for proper preparation in warming cabinet 180. In another example, a user can place a food product in oven section 110 to be prepared by smoking, braising, or other method available in the oven section 110, while simultaneously preparing a second type of food product in warming cabinet 180 to be prepared without the same smoke-filled environment of the oven section 110, for example.

The thickness and/or thermal conductivity of partition 118 can be configured to provide a desired temperature differential between oven section 110 and warming cabinet 180. For example, the partition 118 can be configured such that warming cabinet 180 reaches a temperature that is about half that of the oven section, compared to an ambient temperature baseline (e.g., the maximum, average, or steady state temperature of warming cabinet 180 reaches about half of the maximum, average, or steady state temperature of oven section 110). In other embodiments, partition 118 can be configured such that warming cabinet 180 reaches a temperature that is about 80%, or about 65%, or about 35%, or about 20% of the temperature in oven section 110.

In preferred embodiments, the grill 100 can be configured such that there are three independent temperature zones vertically oriented with respect to one another. For example, oven section 110 can represent a first temperature zone, warming cabinet 180 can represent a second temperature zone, and utility space 176 can represent a third (or ambient) temperature zone. In such embodiments, the temperature zones will transition from highest to lowest with vertical downward movement. For example, oven section 110 can have a high temperature, (e.g., for cooking), warming cabinet 180 can have a medium temperature (e.g., for warming), and utility space 176 can have a low temperature (e.g., ambient temperature). Thus, a variety of different food products and/or other items requiring different temperatures and/or modes of preparation can be simultaneously prepared and/or stored on the grill 100.

In certain embodiments, partition 118 can also include a heat transfer component 188 (disposed therein). Heat transfer component 188 can comprise a cupping member having one or more holes or openings 189 disposed therein and/or extending therethrough. As illustrated in FIG. 4, cupping member 188 can house and/or contain a heat-transfer component 138. In certain embodiments, heat-transfer component 138 can comprise a heat sink in thermal communication with and/or attached to burning zone 112. Accordingly, heat sink 138 can draw heat from fire pot 112 downwardly into cupping member 188, wherein the heated air within cupping member 188 can flow and/or escape into internal warming compartment 184 of warming cabinet 180 through openings 189. The temperature within internal warming compartment 184 can be displayed by a temperature display element, such as a thermometer 181.

Figure 5:
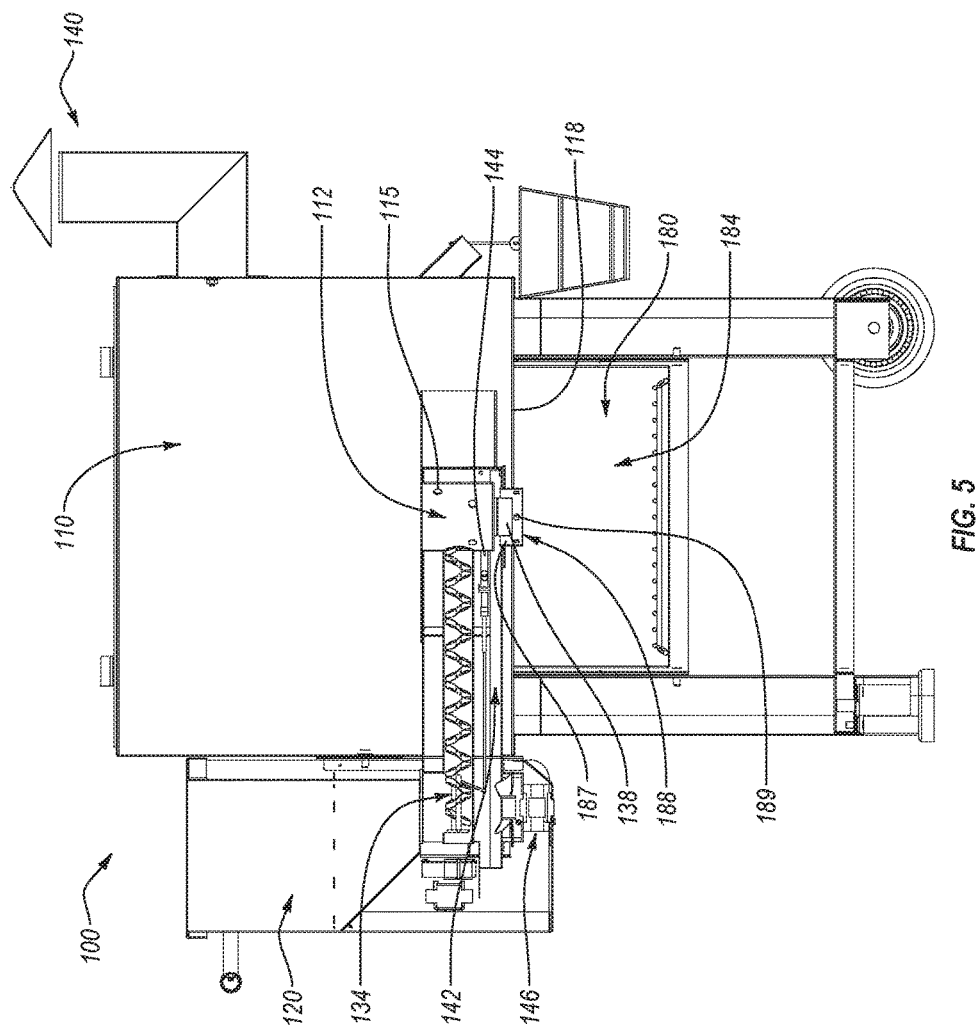
FIG. 5 illustrates a front, cross-sectional view of the grill of FIG. 1A.

FIG. 4 also illustrates an ignition element 144 extending into fire pot 112. Ignition element 144 can ignite a fuel source disposed within fire pot 112. Grill 100 can also include an air path 142 extending from an air moving element, such as a fan or blower, (see air moving elements 146 of FIG. 5) to a heating component (e.g., comprising burning zone 112). Air moving element 146 can be configured to provide air to fire pot 112 during fuel source ignition and/or burning. Fire pot 112 can also include one or more air openings 115 disposed therein and/or extending therethrough. Air openings 115 can permit air from air moving element 146 via air path 142 to pass into burning zone/fire pot 112 to ignite and/or maintain the burning of the fuel source within the fire pot. Air path 142 can also extend to cupping member 188. Cupping member 188 can include at least one air opening (or mouth) 187 to permit air to enter cupping member 188 and draw (or be warmed and/or heated by) heat from heat sink 138. The air can also be warmed and/or heated by exposure to one or more other elements along air path 142 (e.g., ignition member 144, portion(s) of conveyance mechanism 134, fire pot 112, etc.) As the moving air exits cupping member 188 through openings 189, the heated air can warm internal warming compartment 184 of warming cabinet 180.

Thus, heat from or generated in oven section 110 can be transferred (i) passively (e.g., via conduction and radiation) through partition 118 or dividing wall 111 and into warming cabinet 180 (or internal warming compartment 184 thereof), and/or (ii) actively (e.g., via forced air convection) as air moving element 146 forces air past the optional heat sink and/or other heating component(s) and into warming cabinet 180 (or internal warming compartment 184 thereof).

Certain embodiments of the present disclosure can also include methods of operating grill 100 and/or preparing one or more food products. A more detailed description of various methods and our processes contemplated herein can be made with reference to FIGS. 4 and 5. In an illustrative embodiment, hopper 120 of grill 100 can be filled with an ignitable fuel source such as a wood pellets. Controller 130 is switched on and adjusted to a first, ignition setting. In the ignition setting, air moving element 146 can operate at a first (low) speed, moving air (slowly) along air path 142, from air moving element 146 to the heating component (e.g., comprising burning zone/fire pot 112, ignition element 144, heat sink 138, and/or cupping member 188). In addition, conveyance mechanism 134 can operate at a first (low) speed, moving the wood pellets (slowly) from hopper 120 into burning zone 112. Ignition element 144 can also be operated in the ignition setting. Together, the slow delivery of the wood pellets to fire pot 112, with the operation of ignition element 144 and air provided by air moving element 146 can allow for the ignition of the wood pellets within fire pot 112.

As indicated above, air moving element 146 can also force air through cupping member 188 and into internal warming compartment 184 of warming cabinet 180. To facilitate this heating of internal warming compartment 184, selectable venting element 190 can be placed in a closed configuration by means of selecting member 192. In the closed position, air traveling through air path 142 can be heated as it passes burning zone 112 and heat sink 138. As the heated air passes through cupping member 188 and into internal warming compartment 184 by means of openings 189, the warm air can accumulate in the upper portion of internal warming compartment 184 instead of escaping out through selectable venting element 190. In some embodiments, it may also be beneficial to open the lid 160 of oven section 110 (to allow for increased airflow during ignition).

After an appropriate period of time, the wood pellets in fire pot 112 can be burning and/or smoldering. Proper burning and/or smoldering of the wood pellets within fire pot 112 can be indicated by the formation of smoke, which may escape fire pot 112 and fill internal oven compartment 113. Because of the operation of air moving element 146, positive air pressure flowing into fire pot 112 through openings 115 can cause this smoke to ascend upward out of fire pot 112 instead of retreating into air path 142. Accordingly, operation of air moving element 146 can also reduce, inhibit, and/or substantially prevent smoke generated in burning zone 112 from passing into internal warming compartment 184 of warming cabinet 180 via openings 189 in cupping member 188.

By closing lid 160 of oven section 110, the smoke generated by burning the fuel source at the first setting may accumulate in internal oven compartment 113. Accordingly, the first control setting can also comprise a smoke setting (for smoking food products). A food product can, therefore, be added to internal oven compartment 113 (e.g., on food product rack 116 thereof) for preparation by smoking. Excess smoke can escape internal oven compartment 113 by means of smoke exhaust vent 140. Those skilled in the art will appreciate that the smoke setting may also involve a low internal temperature within internal oven compartment 113. Accordingly, the amount of heat transferred from oven section 110 into warming cabinet 180 (via conduction and radiation through partition 118 and/or forced air convection through openings 189 in cupping member 188) may only raise the internal temperature of internal warming compartment 184 to a low warming temperature. At an appropriate time, the food product can be transferred from oven section 110 into warming cabinet 180 and the second temperature zone provided thereby.

To raise the internal temperature within internal oven compartment 113 and/or internal warming compartment 184, controller 130 can be adjusted to a second setting. In at least one embodiment, the second setting can increase the operating speed of conveyance mechanism 134 and/or air moving element 146. Ignition element 144 may also continue to operate and/or be operated at a higher level. Accordingly, the fuel source may be delivered more rapidly into burning zone 112 and/or the smoldering fuel source in burning zone 112 can be stoked by additional air supply. Higher temperature settings can also reduce the amount of smoke generated by the burning of the fuel source in fire pot 112. Accordingly, the second setting may comprise a cooking and/or grilling setting, wherein the internal temperature of internal oven compartment 113 is raised to a level higher than that achieved by the first setting.

In addition, the amount of heat transferred from oven section 110 into warming cabinet 180 (via conduction and radiation through partition 118 and/or forced air convection through openings 189 in cupping member 188) in the second setting may raise the internal temperature of internal warming compartment 184 to a medium warming temperature. Additional control and/or temperature settings are also contemplated herein and may involve operating conveyance mechanism 134 and/or air moving element 146 at higher speeds.

As heat from and/or generated in oven section 110 and/or internal oven compartment 113 thereof continues to be transferred into warming cabinet 180 and/or internal warming compartment 184 thereof (via conduction and radiation through partition 118 and/or forced air convection through openings 189 in cupping member 188), the internal temperature within internal warming compartment 184 may be raised substantially above the ambient temperature. However, because of the physical separation between internal oven compartment 113 and internal warming compartment 184 provided by partition 118, the internal temperature within internal warming compartment 184 may still be substantially below the internal temperature within internal oven compartment 113 (at any given control and/or temperature setting). Accordingly, embodiments of the present disclosure can provide separate temperature zones within grill 100. The higher temperature zone within oven section 110 can comprise a smoking and/or cooking temperature, while the lower temperature zone within warming cabinet 180 can comprise a warming temperature.

As warm air continues to accumulate within internal warming compartment 184, permanent vents 194 disposed in the bottom portion of the internal warming compartment 184 can allow for warm air to escape gradually. However, in some embodiments, permanent vents 194 may not allow warm air to escape fast enough to prevent overcooking, drying, and/or burning of food products disposed in warming cabinet 180. Thus, precise control over the temperatures within internal oven compartment 113 and/or internal warming compartment 184, respectively, may be desirable (e.g., to prevent burning and/or overcooking of food products within oven section 110 and/or warming cabinet 180). Operation of controller 130 and/or actuation of lid 160 can directly control the temperature within internal oven compartment 113 in some embodiments. However, because the temperature within internal warming compartment 184 is raised and/or lowered at least partially indirectly through partition 118, a separate temperature control mechanism for warming cabinet 180 may be desirable (e.g., to prevent burning and/or overcooking of food products within warming cabinet 180).

Selectable vents 190 disposed in the upper portion of warming cabinet 180 can be operated for a precise temperature control within internal warming compartment 184. In particular, temperature display element 181 may indicate that the temperature within warming cabinet 180 has reached an undesirable level. It may not be desirable to open door 182 of warming cabinet 180 during operation. Accordingly, selecting member 192 may be adjusted to selectively open louvers 190. Because louvers 190 are disposed in the upper portion of warming cabinet 180, air entering the internal warming compartment 184 by means of air path 142 can begin to force (warm) air out of internal warming compartment 184 through louvers 190. Similarly, (cool and/or fresh) air can enter into internal warming compartment 184 through permanent vents 194. In at least one embodiment, the further louvers 190 are opened, the more warm air is permitted to escape internal warming compartment 184 and/or the more cool air is permitted to enter internal warming compartment 184. By monitoring temperature display element 181, a user can determine the precise time appropriate for opening louvers 190 and/or the appropriate degree to which louvers 190 should be opened.

Thus, embodiments of the present disclosure can provide a plurality of temperature zones for preparing food products. In some embodiments, the upper temperature zone will always be higher than the lower temperature zone. Accordingly, the lower temperature zone can comprise a warming zoning configured to maintain the temperature of the food product and/or provide an environment in which the food product can be warmed and/or heated at a temperature lower than that found in the upper temperature zone.

Figure 6:
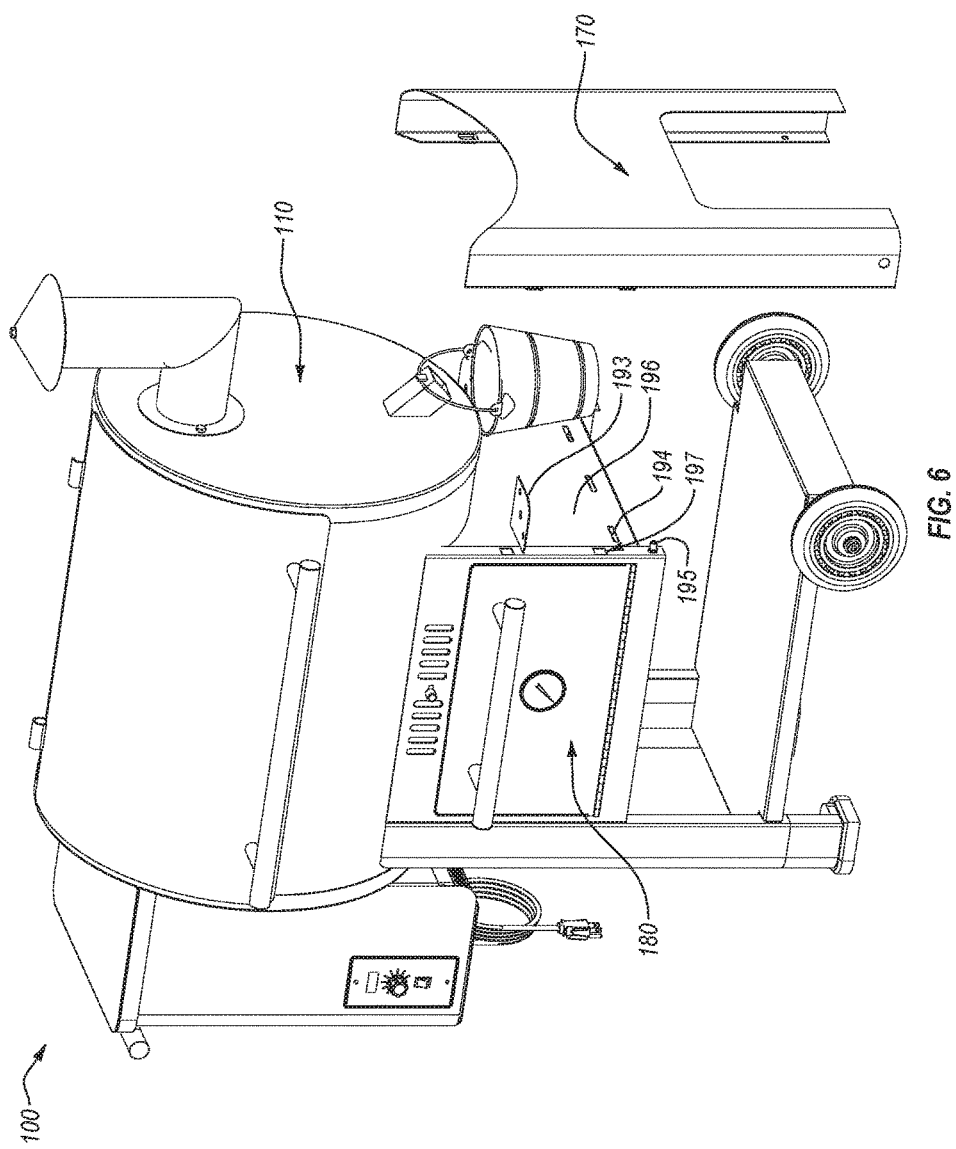
FIG. 6 illustrates a partially exploded view of the grill of FIG. 1A.
Figure 7:
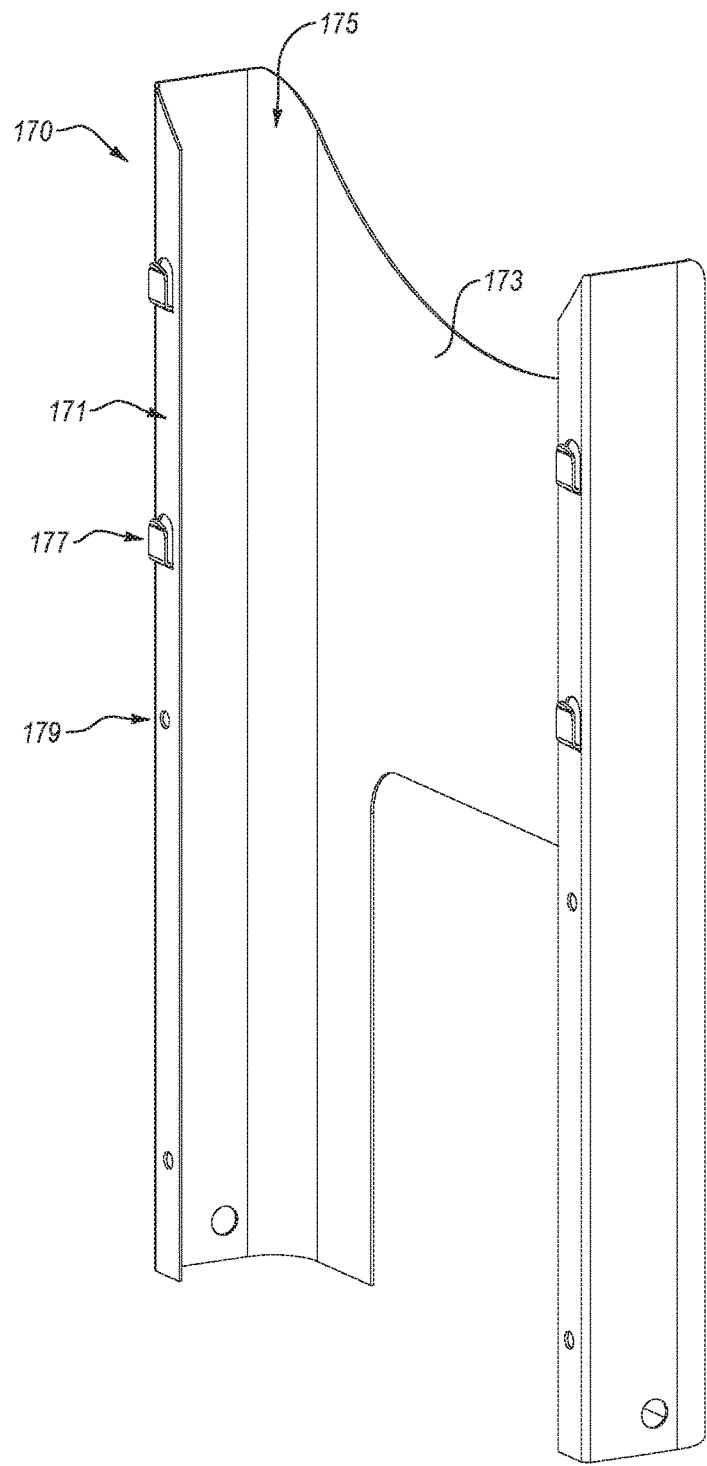
FIG. 7 illustrates a rear perspective view of a grill support member according to an embodiment of the present disclosure.

Referring now to FIGS. 6 and 7, grill 100 can be supported by one or more support members 170. Support member(s) 170 can be attached to oven section 110 and/or warming cabinet 180. For instance, support member 170 can be attached to the outside face of side wall 196 of warming cabinet 180 and/or substantially below oven section 110 in some embodiments. Accordingly, side wall 196 of warming cabinet 180 can include one or more mounting elements 197 for attaching and/or mounting support member 170 thereto. Alternatively, mounting element(s) 197 can be disposed in another portion of warming cabinet 180 and/or oven section 110. As illustrated in FIG. 6, mounting element 197 can comprise an opening, aperture, or hole. In addition, support member 170 can have one or more attachment elements 177 configured to interface with mounting elements 197. As illustrated in FIG. 7, attachment element 177 can comprise a protrusion or hook extending from an interface surface 171 and/or insertable into mounting element 197. Upon insertion thereof, attachment element(s) 177 can support the weight of one or more components of grill 100 above a support surface.

Returning to FIG. 6, grill 100 can also include one or more fasteners 195 for connecting support member 170 to oven section 110 and/or warming cabinet 180. For instance, fastener 195 can comprise a threaded element, screw, bolt, rivet, bracket, clamp, clip, or other means for fastening. As shown in FIG. 7, support member 170 can include one or more fastener receiving elements (e.g., a (threaded) hole). In at least one embodiment, fastener 195 maintains an attachment position of support member 170 relative to oven section 110 and/or warming cabinet 180. However, in certain embodiments, the weight of oven section 110 and/or warming cabinet 180 are substantially supported by attachment element(s) 177.

Support member 170 can also be configured to maintain air flow through warming cabinet 180. For instance, support member 170 can comprise a recessed wall 173 separated from interface surface 171 by a cavity 175. Upon attachment to oven section 110 and/or warming cabinet 180, cavity 175 can allow air to flow in and/or out of warming cabinet 180 via vents 194 (see FIG. 6). As shown in FIG. 6, one or more spacing elements 193 can also be provided to maintain, support, and/or reinforce an appropriate distance between side wall 196 and support member 170 (e.g., such that recessed wall 173 is prevented and/or inhibited from collapsing towards side wall 196).

The foregoing detailed description makes reference to specific exemplary embodiments. However, it will be appreciated that various modifications and changes can be made without departing from the scope contemplated herein and as set forth in the appended claims. In particular, while illustrative exemplary embodiments in this disclosure have been more particularly described, the present disclosure is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description, which examples are to be construed as non-exclusive.

Moreover, any steps recited in any method or process described herein and/or recited in the claims may be executed in any order and are not necessarily limited to the order presented in the claims, unless otherwise stated (explicitly or implicitly) in the claims. Accordingly, the scope of the invention should be determined solely by the appended claims and their legal equivalents, rather than by the descriptions and examples given above.

It will also be appreciated that various features, members, elements, parts, and/or portions of certain embodiments of the present invention are compatible with and/or can be combined with, included in, and/or incorporated into other embodiments of the present invention. Thus, disclosure a certain features, members, elements, parts, and/or portions relative to a specific embodiment of the present invention should not be construed as limiting application or inclusion of said features, members, elements, parts, and/or portions to the specific embodiment. Rather, it will be appreciated that other embodiments can also include said features, members, elements, parts, and/or portions without necessarily departing from the scope of the present invention. Likewise, certain embodiments can include fewer features than those disclosed in specific examples without necessarily departing from the scope of this disclosure.

In addition, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A grilling device, comprising:
    an oven section comprising a first product rack and a first lid;
    a warming section in thermal communication with the oven section, such that heat from the oven section is transferred to the warming section by conduction and radiation, wherein the warming section is positioned directly beneath a heating mechanism of the oven section, the warming section further comprising a second food product rack, and a second lid for accessing the second food product rack; and
    at least one air moving element located above the warming section and beneath the oven section;
    wherein at least one air moving element forces heated air both (i) within the heating mechanism, and (ii) directly below the oven section into the warming section.

2. The grilling device of claim 1, further comprising a heating mechanism connected below the oven section and above the warming section, the heating mechanism configured to raise an internal temperature of both the oven section and the warming section.

3. The grilling device of claim 2, wherein at least a portion of the heating mechanism is disposed within the oven section, the warming section being devoid of the heating mechanism.

4. The grilling device of claim 1, wherein:
    the oven section comprises an internal oven compartment at least partially bound by an outer oven wall; and
    the warming section comprising an internal warming compartment, the outer oven wall at least partially separating the internal oven compartment from the internal warming compartment.

5. The grilling device of claim 4, wherein:
    the outer oven wall is disposed between the internal oven compartment and the internal warming compartment; and
    heat from the internal oven compartment is transferred through the outer oven wall to the internal warming compartment of the warming section.

6. The grilling device of claim 5, wherein a bottom portion of the outer oven wall forms an upper portion of the warming section.

7. The grilling device of claim 5, wherein:
    the internal oven compartment and the internal warming compartment are positioned adjacent one to another without an intervening heat shield; and
    heat from the internal oven compartment is transferred through the outer oven wall to the internal warming compartment of the warming section via radiant heating.

8. The grilling device of claim 4, further comprising a heat sink connected to the outer oven wall, the heat sink configured to transfer heat from the internal oven compartment to the internal warming compartment.

9. The grilling device of claim 4, further comprising:
a cupping member having one or more holes or openings disposed therein;
wherein the cupping member:
holds the heat sink beneath the heating mechanism; and
provides heated air from the air moving element to the warming compartment via the one or more holes or openings.

10. The grilling device of claim 1, wherein the warming section further comprises one or more venting elements.

11. The grilling device of claim 10, wherein the one or more venting elements comprises at least one permanent vent and at least one selectable vent.

12. The grilling device of claim 11, wherein the selectable vent comprises a louver selectively adjustable between a closed position and a plurality of open positions.

13. The grilling device of claim 1, further comprising:
a utility shelf disposed below the warming cabinet; and
a space between the utility shelf and the bottom of the warming cabinet defining a utility space.

14. A grilling device for providing multiple temperature zones simultaneously, comprising:
an oven section comprising an internal oven compartment at least partially bound by an outer oven wall, at least a portion of the outer oven wall being formed of a heat conductive material;
a warming section disposed underneath the oven section and in thermal communication with the oven section, the warming section comprising an internal warming compartment and one or more venting elements, the outer oven wall at least partially separating the internal oven compartment from the internal warming compartment;
wherein heat from the oven section is transferred via conduction and radiation through the outer oven wall and into the internal warming compartment;
a heating mechanism configured to raise an internal temperature in the internal oven compartment, at least a portion of the heating mechanism being disposed within the oven section; and
an air moving element located beneath a food product rack of the oven section and above a food product rack of the warming section, wherein the air moving element is configured to both (i) distribute heated air to the heating mechanism and (ii) force the heated air from the oven section beneath the heating mechanism into the warming section;
wherein the oven section represents a first temperature zone for heating food at a first temperature, and the warming cabinet represents a second temperature zone for warming food on the corresponding food product rack at a second, lower temperature.

15. The grilling device of claim 14, wherein the one or more venting elements comprise a permanent venting element disposed in a lower portion of the internal warming compartment and a selectable venting element disposed in an upper portion of the internal warming compartment, the selectable venting element being selectively adjustable between a closed position and one or a plurality of open positions such that:
in the closed position, operation of the heating mechanism and the air moving element introduces warmer air into the upper portion of the internal warming compartment and forces cooler air in the bottom portion of the internal warming compartment out through the permanent venting element; and
in the one or plurality of open positions, operation of the heating mechanism and the air moving element forces warmer air in the upper portion of the internal warming compartment out through the selectable venting element as cooler air is introduced into the lower portion of the internal warming compartment through the permanent venting element, wherein the amount of warmer air forced out of the internal warming compartment is directly proportional to the degree to which the selectable venting element is opened.

16. The grilling device of claim 15, further comprising:
a heat sink connected to the outer oven wall, the heat sink configured to transfer heat from the internal oven compartment to the internal warming compartment;
wherein the air moving element forces air past the heat sink and into the internal warming compartment, the internal warming compartment being devoid of the heating mechanism.

17. The grilling device of claim 16, further comprising:
a cupping member having one or more holes or openings disposed therein;
wherein the cupping member:
holds the heat sink beneath the heating mechanism; and
provides heated air from the air moving element to the warming compartment via the one or more holes or openings.

18. The grilling device of claim 14, further comprising:
an air path that couples the air moving element directly to a lateral side of the heating mechanism and downwardly to the warming cabinet.

19. The grilling device of claim 14, further comprising:
a conveying mechanism positioned below the oven section and positioned above the warming section;
wherein the conveying mechanism is coupled laterally to the heating mechanism.

* * * * *